United States Patent [19]

Guralp

[11] 4,280,206

[45] Jul. 21, 1981

[54] SEISMOMETERS

[75] Inventor: Cansun M. Guralp, Reading, England

[73] Assignee: National Research Development Corporation, London, England

[21] Appl. No.: 20,502

[22] Filed: Mar. 14, 1979

[30] Foreign Application Priority Data

Mar. 15, 1978 [GB] United Kingdom ............... 10276/78

[51] Int. Cl.³ .............................................. G01V 1/18
[52] U.S. Cl. ................................... 367/179; 181/122; 73/652
[58] Field of Search ........................ 367/179; 181/122; 73/651, 652, 650

[56] References Cited

U.S. PATENT DOCUMENTS

| 1,789,055 | 1/1931 | Taylor | 367/179 |
| 3,194,060 | 7/1965 | Greenwood | 367/179 |

FOREIGN PATENT DOCUMENTS

| 806800 | 7/1949 | Fed. Rep. of Germany | 73/651 |
| 1025156 | 2/1958 | Fed. Rep. of Germany | 73/652 |

OTHER PUBLICATIONS

Usher, "Developments in Seismometry", 1973, pp. 501–507, J. Phys. E., Sci Instrum 6.
Usher et al., "A Miniature Wideband . . . Seismometer", 12/77 pp. 1253–1260, J. Phys. E, Sci. Instrum 10.
Usher et al., "The Design of . . . Seismometers", 1978, pp. 605–613, Geophys. J. R. Astr. Soc.
Uspenshiy et al., "A Miniature Long Period Seismomograph", 6/73, pp. 394–398, Phys. of the Solid Earth, #6.

Primary Examiner—Nelson Moskowitz
Attorney, Agent, or Firm—Cushman, Darby & Cushman

[57] ABSTRACT

A vertical seismometer comprises a horizontal boom 2 carrying a mass 1 frictionlessly pivoted about a horizontal axis 3. The boom is supported by a pre-stressed vertically extending flat spring 4 having one end rigidly attached to the boom adjacent to and intersecting this axis so that movement of the boom applies a turning moment to the flat spring at its attachment end. A further pre-stressed flat spring 5 pivoted at right angles to the other end of the first-mentioned flat spring has its other end rigidly connected to the frame 13 of the seismometer and applies a constant force along the longitudinal axis of the latter spring towards the end attached to the boom.

8 Claims, 8 Drawing Figures

SEISMOMETERS

BACKGROUND OF THE INVENTION

This invention relates to vertical seismometers.

Seismometers of the kind with which the present invention is concerned essentially comprise a mass freely supported by a spring from a base which, in use, is in contact with the earth's surface. Movements of the earth's surface are measured as movements of the mass relative to the base.

Until fairly recently, seismological instruments were designed to cover one of two distinct signal bandwidths, viz short period (say 0.3–2 seconds period) and long period (say 15–40 seconds period). Short-period recording has never presented substantial difficulties. Long-period recording, however, has required seismometers having a long natural period (i.e. the resonant oscillation period of the mass and spring) of 20–30 seconds, and such long-period instruments tend to be awkwardly large.

In the last few years interest has been shown in obtaining a single instrument to cover the complete bandwidth of 0.1–100 seconds period. Moreover the introduction of electronic feedback techniques has made possible the design of small wideband seismometers. These developments were foreshadowed in a paper "Developments in Seismometry" by M. J. Usher in J. Phys E: Sci Instrum 6, pp 501–507 (1973), to which reference may also be made for a general discussion of the theory and practice of seismometry. More recently, the same author with I. W. Buckner and R. F. Burch has published a paper "A miniature wideband horizontal-component feedback seismometer" (J Phys E: Sci Instrum 10, pp 1253–1260, (December 1977)), which describes a small seismometer and associated electronic circuits which were developed in pursuit of the above objective.

Briefly, in a feedback seismometer such as that described in the second of the above papers, the movement of the mass relative to the base is detected by a transducer and a force proportional to eg the relative displacement, velocity or acceleration is fed back in such a sense as to oppose the relative movement. As in the instrument described in that paper, the signal-detecting transducer may be capacitative and the restoring force may be applied to the mass by means of an electromagnetic force transducer. Instead of requiring a natural period of, say, 20 seconds for long-period measurements as hitherto, by such means a comparable performance can be obtained using a seismometer having a natural period of only about 1 second, although the longer the better, as discussed by M. J. Usher, C. Guralp and R. F. Burch in "The design of miniature wideband seismometers" (Geophys J. R. astr Soc (1978) 55, pp 605–613).

The present invention provides a vertical seismometer suitable for use with an electronic feedback system similar to those described in the second and third of the above papers.

It comprises a novel form of spring syspension for the inertial mass which allows the following desiderata to be met:

(a) A natural period of at least 1 second in order to produce a sufficient relative displacement of mass-to-input ground acceleration ratio of the sensing mass. (This ratio is proportional to the square of the period).

(b) Avoidance of excessive stress cycles in the spring to prevent degradation of its properties.

(c) Mechanical compactness to allow a vertical seismometer to be lowered down a relatively narrow bore-hole, for example of 4-inch diameter.

(d) Mechanical ruggedness to withstand field operation and outdoor maintenance with non-specialised tools.

(e) Spurious frequencies of oscillation of the suspension above the seismic frequencies of interest to avoid unwanted coupling of vibrations.

SUMMARY OF THE INVENTION

According to the present invention a vertical seismometer comprises:

a mass-carrying horizontally-extending boom pivoted to a rigid frame so as to move about a fixed horizontal axis;

a pre-stressed flat spring having one end rigidly connected to the boom adjacent said fixed axis so that movement of the boom applies a turning moment to the spring at said one end thereof;

means for locating the other end of said flat spring laterally relative to its longitudinal axis;

and means for applying a substantially constant force at said other end along said longitudinal axis, said longitudinal axis intersecting said fixed axis so that said force applies substantially zero turning moment to the boom.

Said means for locating the other end of the flat spring and for applying said force preferably comprises a further spring having one end pivoted to said other end of the flat spring and its other end rigidly connected, in use, to the frame, the longitudinal axes of the two springs being substantially at right angles to one another. Preferably the further spring is also a flat spring.

Alternative means for locating said other end of the flat spring and for applying said force are possible, however. For example said other end can be located by spokes or guide means, and the force applied by a weight, or by a coil spring in compression. Again, said other end of the flat spring can be fixedly held with the flat spring compressed to a slightly bowed state so that, in effect, the flat spring itself provides the axial force.

For maximum stability and linearity of the instrument, the flat spring should be substantially straight in the rest position of the boom. The arrangement described in the last sentence of the immediately preceding paragraph is therefore less advantageous in this respect; also, the applied force is less constant, varying as the boom moves.

The flat spring supports the weight of the mass-carrying boom and is pre-stressed so as to be substantially straight in the rest position of the boom. The further spring is pre-stressed to apply the axial force to the flat spring.

In a preferred configuration the flat spring is aligned substantially vertically and the further spring is aligned substantially horizontally, extending from the flat spring in the same direction as the boom. The position and/or alignment of the rigidly connected end of the further spring may be adjustable relative to the frame for setting-up the seismometer.

In this configuration the flat spring is pre-stressed so that in its relaxed position (i.e. disconnected from the further spring) it would incline towards the boom, and the further spring is pre-stressed so that in its relaxed position it likewise would incline towards the boom.

As is conventional in seismometer spring suspension, the flat spring is preferably triangular, having its broad end adjacent the axis of the boom. Where the further spring is flat, it too is preferably triangular having its broad end rigidly connected, in use, to the frame. In the rest position of the boom, both springs are substantially straight and at right angles to one another.

DESCRIPTION OF THE DRAWINGS

To enable the nature of the present invention to be more readily understood, attention is directed, by way of example, to the accompanying drawings wherein.

DESCRIPTION OF PREFERRED EMBODIMENT

Figure 1:
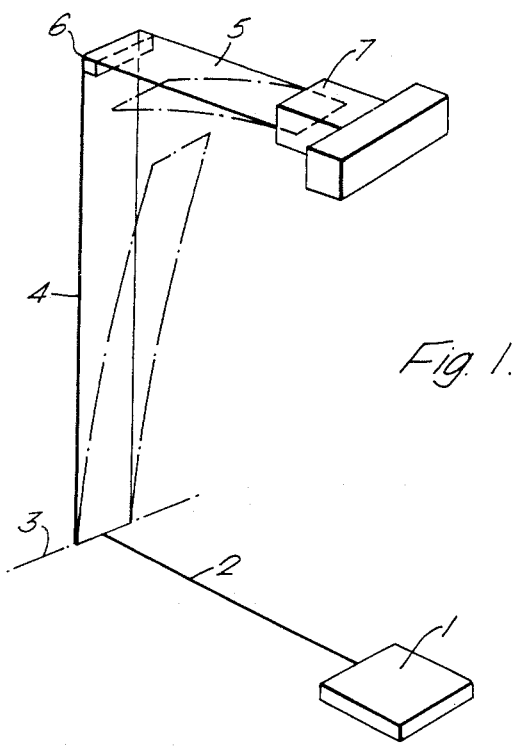
FIG. 1 is a diagram showing a preferred spring configuration in a vertical seismometer embodying the present invention.

In FIG. 1 an inertial mass 1 is mounted on a horizontal boom 2 which is pivoted in a conventional frictionless manner about a fixed horizontal axis 3. A flat spring 4 is rigidly connected to the boom at axis 3 and extends vertically to meet a further flat spring 5 to which it is rigidly connected at 6. Spring 5 extends horizontally parallel to boom 2 and is rigidly fixed at 7. Both springs are pre-stressed so that if disconnected at 6, their relaxed positions would be as indicated by the interrupted lines.

FIG. 1 illustrates the arrangement in its rest position. The mass 1 is essentially supported by the spring 4, to whose lower end the mass applies a turning moment at axis 3. Spring 4 is pre-stressed to a degree such that in the rest position it is substantially straightened by the latter turning moment. The upper end of spring 4 is located at 6 by the spring 5 which also applies a substantially constant downward force along the longitudinal axis of spring 4. The latter axis intersects axis 3, and the downward force therefore exerts no turning moment on boom 2. Spring 5 is likewise pre-stressed so that in the rest position it is substantially straight and at right angles to spring 4.

Figure 2:
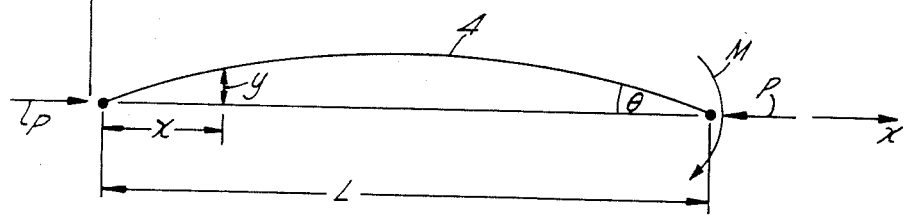
FIG. 2 is a diagram illustrating the motion of the flat supporting spring in FIG. 1 under the conditions of the present invention.

The behaviour and properties of the spring 4 under the above conditions can be determined by regarding it as a beam subjected to an end-moment and an axial load as shown in FIG. 2. (In FIG. 2 the spring of beam 4 is shown horizontal to allow conventional (x,y) notation to be used).

The moment equation of any point x along the length of the beam 4 (here assumed a flat elongated rectangle, as shown in FIG. 1) is $$(EI d^2y/dx^2 + Py = (Mx/L)) \quad (1)$$

where
M is the end-moment
P is the axial load
y is the deflection in the y direction
x is the distance along the length of the beam
E is the modulus of elasticity
I is the moment of inertia of the cross-section of the beam
L is the length of the beam.

The torsional stiffness of the beam can be found by solving equation (1), and its solution for different values of P gives the corresponding end-moment torsional stiffness of the beam, i.e. in FIG. 2 the variation of $\theta$ with M. With P positive (i.e. corresponding the beam axially), the torsional stiffness becomes smaller, and with P negative the beam becomes stiffer to end-moments. As spring 5 applies a positive P, its effect is to increase the natural period of oscillation of the mass 1/spring 4 arrangement in FIG. 1, which is proportional to the reciprocal of the square-root of the spring stiffness.

The linearity of the variation of $\theta$ with M will depend on the constancy of the axial load P. Variation of this load results in variation of the beam stiffness and consequently of the natural period of oscillation. In the FIG. 1 spring 5 provides a substantially constant axial load.

It should be noted that the above-described behaviour is independent of any pre-stressing of the beam, such as is applied to spring 4 in order to support the mass 1 as described earlier. The effect of the load P can be regarded as superimposed on the pre-stressed state of the spring.

The natural frequency of vibration of each of springs 4 and 5 in isolation should be much greater than the maximum frequency of interest of the earth noise, i.e. greater than about 30 Hz. The use of flat springs eliminates the problem of the low-frequency lateral oscillations which occur with helical springs.

Figure 5:
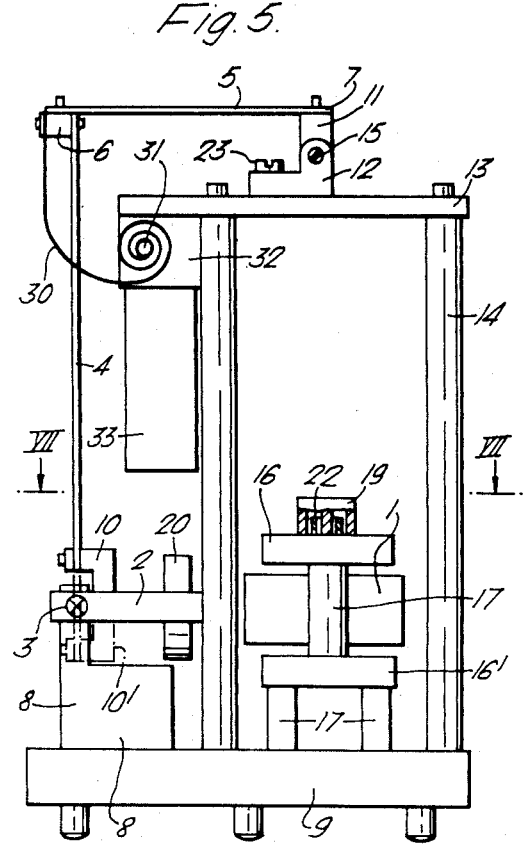
FIG. 5 is a simplified side-elevation of a vertical seismometer embodying the present invention.
Figure 6:
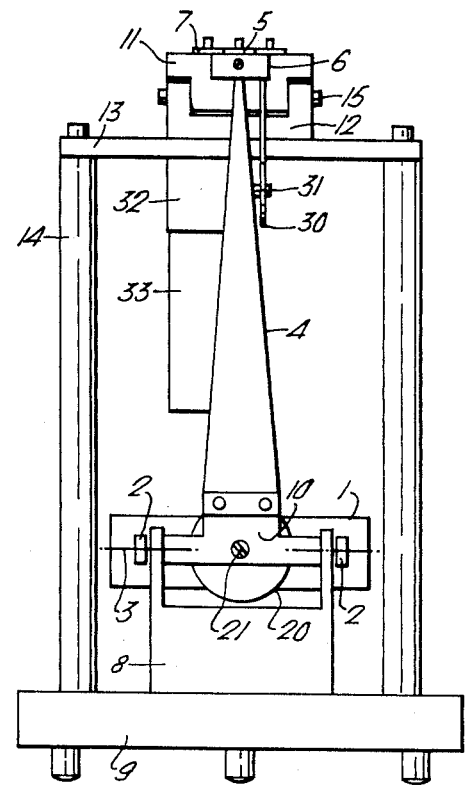
FIG. 6 is a rear elevation of the seismometer of FIG. 5.
Figure 7:
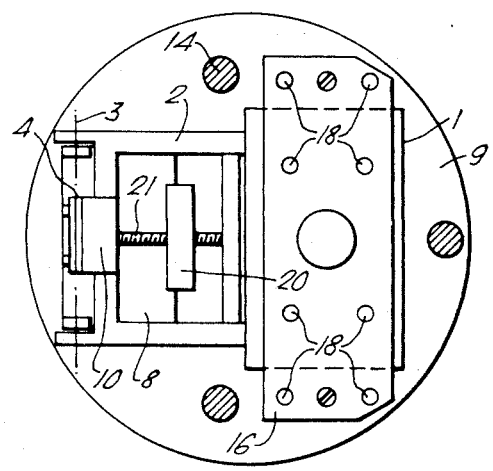
FIG. 7 is a section on the line VII—VII in FIG. 5.

As previously stated (and as shown in FIGS. 5 to 7 to be described) the preferred form of spring 4 is a triangle of uniform thickness. Although equation (1) above applies only to a flat rectangular beam, (This stiffness is also a function of their loading, but for simplicity the listed unloaded value of the proprietory pivots used is taken). These pivots alone would give a natural period of 2.16 sec if the stiffness K of spring 4 were zero.

For the practical case the two stiffnesses are added together and T recalculated from $$T = 2\pi \sqrt{\frac{3 \times 10^{-3}}{K + 2.64 \times 10^{-3}}} \text{ seconds}$$

Table 2 can now be produced to include the stiffness of the pivots 3.

TABLE 2

| R corresponds to P (kg) | Stiffness K + 2.64 × 10⁻³ (Nm/radian) | Natural period T (seconds) |
|---|---|---|
| 0 | 0 | 0.06 | 0.43 |
| 20 | 0.06 | 0.037 | 0.57 |
| 34 | 0.10 | 0.0086 | 1.17 |
| 36 | 0.11 | 0.0044 | 1.64 |

Figure 4:
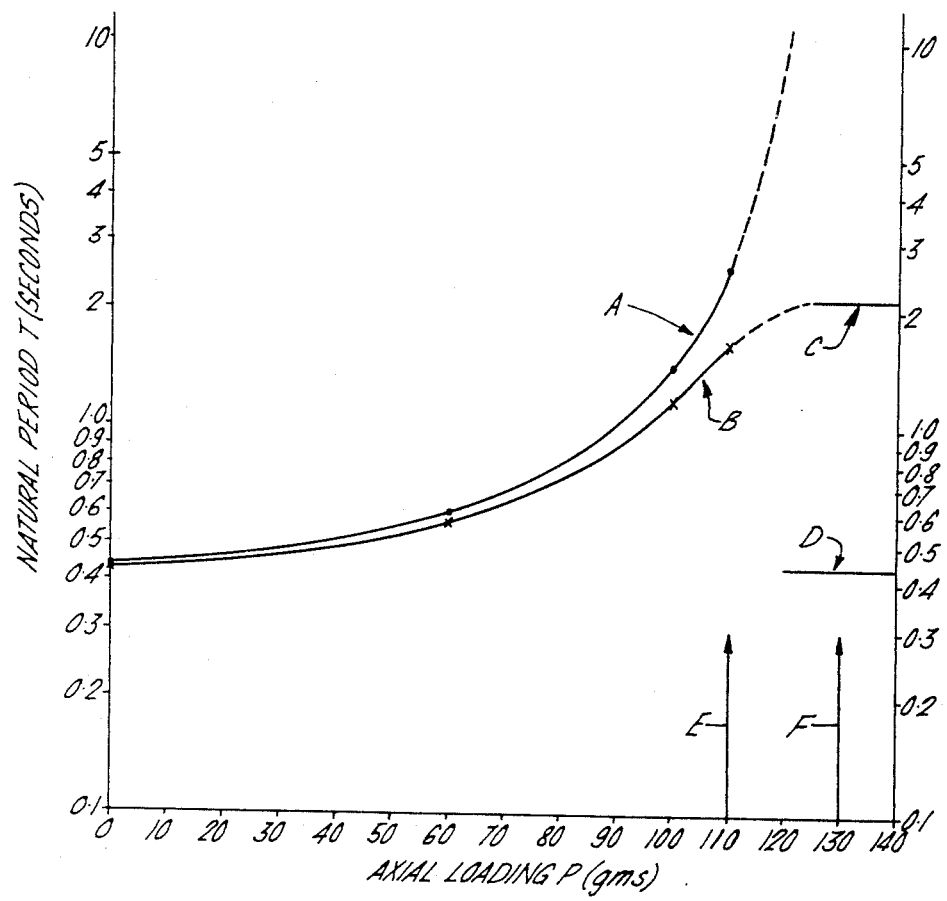
FIG. 4 shows curves of the variation of seismometer natural period with axial loading of the flat spring.

In FIG. 4 curve A is a plot of T against P from Table 1 and curve B is a similar plot from Table 2. FIG. 4 also indicates at C and D respectively the values of T due to the pivots 3 alone (the limiting case) and for P=0. The arrows E and F indicate respectively the operating value of P and the value of P at the threshold of instability.

The present invention thus gives the advantage that a relatively small (but therefore relatively stiff) spring (spring 4) can be used for supporting the mass in the rest position, while its stiffness is "artificially" reduced by the axial loading (spring 5) to give a much longer natural period than the supporting spring alone would provide. equivalent equations can be derived for beams having a cross-sectional area which varies along the length of the beam, e.g. as with a triangular spring. For such non-uniform beams the correct moment of inertia must be used in deriving the equivalent equations. (The analytical solution of such differential equations with complicated moments of inertia is difficult, but can be performed numerically or by an approximate method).

For a triangular spring the equation becomes $$\frac{d^2y}{dx^2} + \frac{12L}{Et^3b} \cdot \frac{Py}{x} = \frac{12M}{Et^3b} \quad (2)$$

where
t is the spring thickness
b is the spring width at its broad end.
The remaining variables are defined for equation (1). Equation (2) can be solved with the use of Bessel functions or a numerical algorithm such as the direct finite-difference method.

Figure 3:
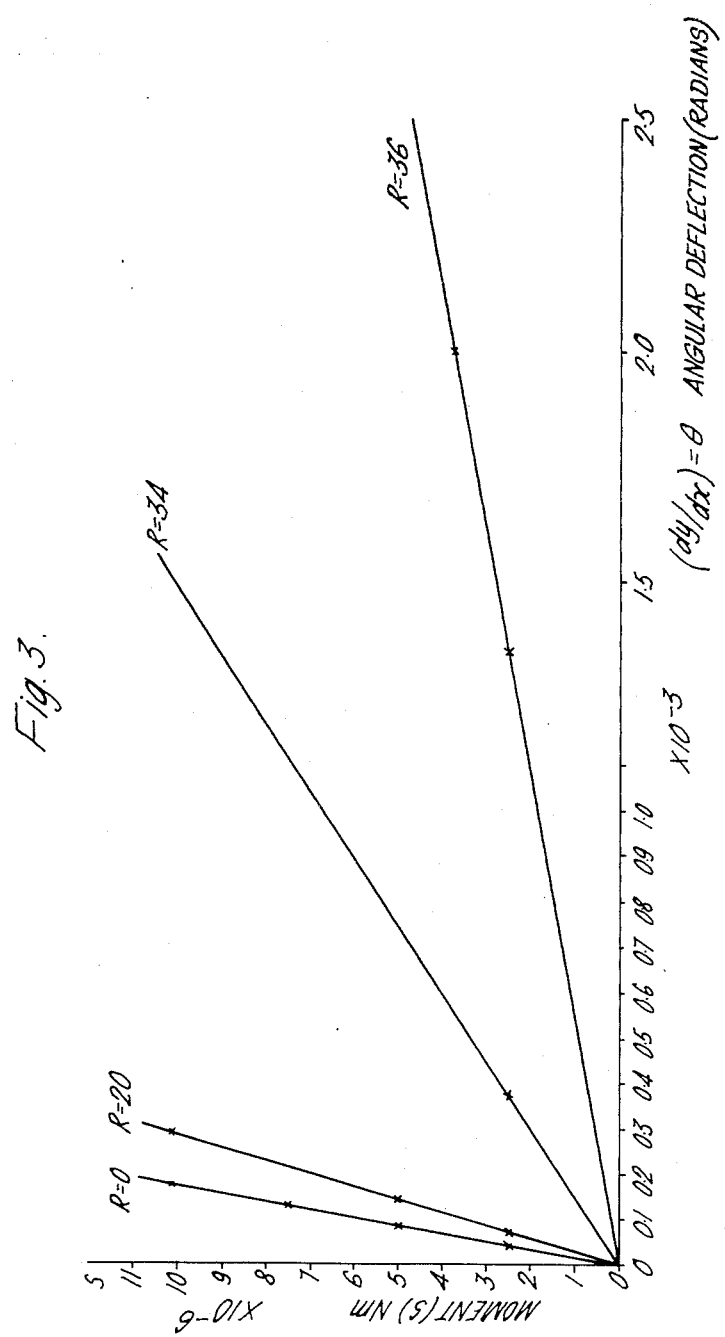
FIG. 3 is a family of curves of end-moment torsional stiffness of the flat spring.

FIGS. 3 and 4 illustrate how the behaviour of the suspension depends on the load P, and are derived as follows. Referring to equation (2), for simplicity put $$R = \frac{12LP}{Et^3b} \text{ and } S = \frac{12M}{Et^3b}$$

Equation (2) then reduces to $$\frac{d^2y}{dx^2} + R\frac{y}{x} = S \quad (3)$$

Values for R and S are then chosen, say $R_{(1)}$ and $S_{(1)}$, and equation (3) solved for y and x by one of the above-mentioned methods. This gives a result for θ in FIG. 2 ($=dy/dx$).

Keeping R constant, S is varied to obtain a set of values for θ.
A new value of R is then chosen and the complete calculation repeated. The result is a family of curves, as shown in FIG. 3, of S against θ for various values of R. The stiffness of spring 4 (K) is given by slope of the straight lines, i.e. $K = S/\theta$.

The natural period of oscillation of a body of moment of inertia J attached to a spring of stiffness K is given by $$T = 2\pi \sqrt{\frac{J}{K}} \text{ seconds}$$

For the embodiment described with reference to FIGS. 5 to 7, $J = 3 \times 10^{-4}$ kgm². Combining this value of J with the graphical results shown in FIG. 3 gives the results summarised in the following Table 1.

TABLE 1

| R corresponds to P (kg) | | Stiffness K = S/θ (Nm/Radian) | Natural Period T (Seconds) |
|---|---|---|---|
| 0 | 0 | 0.062 | 0.44 |
| 20 | 0.06 | 0.034 | 0.60 |
| 34 | 0.10 | 0.006 | 1.41 |
| 36 | 0.11 | 0.0018 | 2.58 |

In the described embodiment R=36, i.e. the load P applied by spring 5 is 0.11 kg. The threshold for instability or buckling of spring 4 is at about P=0.13 kg (R=44).

The results given in Table 1 assume that the pivots 3 in FIG. 1 have zero stiffness. In the practical case these pivots have a finite stiffness and in the described embodiment the value is $2.64 \times 10^{-3}$ Nm/radian.

Referring now to FIGS. 5 to 8 (which for clarity are only partially and approximately to scale), the components corresponding to those of FIG. 1 have the same reference numerals. The mass 1 and boom 2 are made of brass and the triangular pre-stressed springs 4 and 5 of Nispan C. The tapered ends of these springs are rigidly secured to block 6, but are sufficiently flexible to form a pivoted interconnection. (Ideally this interconnection should be a frictionless pivot, but the low torsional stiffness of the narrow ends of the springs is sufficient in practice). The twin parallel arms of boom 2 are each pivoted at 3 by one of two proprietory conventional frictionless cantilever flexural pivots (details of which are omitted from these Figs for clarity) to a rigid pedestal 8 mounted on base 9. The axis of these pivots is intersected by the longitudinal axis of spring 4, whose lower (broad) end is rigidly secured to an upward and rearward extension 10 of boom 2. Alternatively and preferably, the lower end of spring 4 is rigidly secured to a downward and rearward extension of boom 2 which passes rearward below the axis of the pivots 3 as indicated at 10' in FIG. 5, thereby enabling the total height of the instrument to be reduced. It may also be secured to the boom in the line of the axis, as indicated in FIG. 1. The broad end of spring 5 is rigidly connected to a member 11 which can pivot in a pedestal 12 secured to a plate 13. This plate is mounted rigidly on three pillars 14 extending from base 9. In use member 11 is clamped rigidly to pedestal 12 by screw 15, its rotational position being adjustable to control the axial load applied by spring 5 and hence the period of oscillation of the mass 1/spring 4 combination. Instead of such rotational adjustment however, it is preferred to make the end of spring 5 vertically adjustable relative to plate 13 as described later with reference to FIG. 8.

Two adjustments are provided for use in setting the rest position of the beam. One comprises a circular brass weight 20 which can be moved along a threaded rod 21 fixed to the boom in order to vary the moment applied to the end of spring 4. The other is that the pedestal 12 can slide over plate 13 towards and away from spring 4 and be locked in position by screw 23. The latter adjustment allows the spring 4 to be made substantially straight in the rest position. As the above two adjustments, together with the aforementioned adjustment of the downward force by rotation of spring 5 or otherwise, are to some extent interdependent, the final setting may involve progressive variation of all three adjustments.

Figure 8:
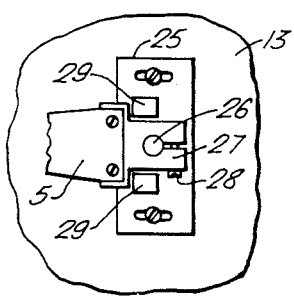
FIG. 8 is a plan view of an alternative adjustment means.

In FIG. 8 a horizontally slidable and clampable block 28 (corresponding to pedestal 12 in FIGS. 5 and 6)

carries a fixed vertical shaft 26 which passes through a member 27 attached to the end of spring 5. Member 22 is slidable on the shaft and clampable thereto by screw 28. Rotation of the member on the shaft during adjustment is limited by two guides 29 mounted on block 25.

FIGS. 5 and 7 also show the differential capacitative transducer from which the indication of relative motion of the mass is obtained and the electromagnetic force transducer by which negative feedback force is applied to maintain the position of the mass sensibly constant relative to the base of the instrument (FIG. 6 omits these components for clarity). The centre plate of the capacitative transducer is constituted by the upper and lower flat faces of mass 1 itself, which is electrically insulated from the remainder of the instrument by thin layers of insulating material (methyl methacrylate) interposed between the boom and the mass (not shown). The two outer plates 16,16' are of brass and are insulated from each other and from the base by fired pyrophyllic spacers 17. In order to reduce the air-damping of the motion of mass 1 by the squeeze film between the transducer plates, holes 18 are drilled in the outer plates. The circular magnet assembly 19 of the force-feedback transducer is mounted on the upper outer plate 16 of the capacitative transducer in order to reduce the effect of magnetic interference with operation of the instrument, and the effect of interaction between adjacent instruments, as may occur when the magnet assembly is mounted on the mass as in earlier instruments. The coil assembly 22 of the force-feedback transducer is mounted on, and projects from, the upper face of the mass 1, and comprises a coil wound on a hollow cylindrical former which extends into the annular space between the centre and outer magnet poles. The connections to the coil are made by very thin flexible wires (not shown). In use the instrument is enclosed in an evacuated case (not shown).

Means for remote re-setting of the rest position of the boom, eg when the instrument is down a bore-hole, may be provided. In FIGS. 5 and 6 such means comprises a very weak flat spiral spring 30 having its outer end clamped to block 6 and its inner end secured to a shaft 31 of a reduction gearbox 32 driven by a reversible electric motor 33. Motor and gearbox are mounted on plate 13. Any drift of the boom is sensed by the negative feedback system, and when the drift moves from within initial preset position limits to beyond further preset position limits, current pulses of appropriate polarity are fed to motor 33 to restore the boom to within the initial preset rest position limits; eg rotation of shaft 31 anti-clockwise applies a small turning moment to block 6 which tends to lower the boom, and vice versa.

In the example of the above-described embodiment from which Tables 1 and 2 and FIGS. 3 and 4 are derived, the inertial mass 1 is about 150 gm, spring 4 is 8.5 cm long, 1 cm wide at its broad end and about 0.25 mm thick, and spring 5 is 4.5 cm long, 1.4 cm wide at its broad end and about 0.5 mm thick. In this example the base 9 is about 8 cm in diameter and the height to spring 5 is about 16 cm (ie excluding the case) with spring 4 attached to extension 10 above the axis of pivots 3 as described.

It may be noted that although the longitudinal axis of the flat spring must intersect the fixed axis about which the boom moves, the invention does not require the longitudinal axis to be at right angles to the boom as shown in the drawings; it can be aligned at any angle thereto.

I claim:
1. A vertical-component seismometer comprising:
    a mass-carrying horizontally-extending boom pivoted to a rigid frame so as to move about a fixed horizontal axis;
    a pre-stressed flat spring having one end rigidly connected to the boom adjacent said fixed axis so that movement of the boom applies a turning moment to the spring at said one end thereof;
    means for locating the other end of said flat spring laterally relative to its longitudinal axis;
    and means for applying a substantially constant compressive force at said other end along said longitudinal axis, said longitudinal axis intersecting said fixed axis so that said force applies substantially zero turning moment to the boom.
2. A seismometer as claimed in claim 1 so arranged that, in use, said flat spring is substantially straight in the rest position of the boom.
3. A seismometer as claimed in claim 1 or claim 2 wherein
    said means for locating the other end of the flat spring and for applying said force comprises a further pre-stressed spring having one end pivoted to said other end of the flat spring and its other end rigidly connected, in use, to the frame, the longitudinal axes of the two springs being substantially at right angles to one another.
4. A seismometer as claimed in claim 3 wherein said further spring is a flat spring.
5. A seismometer as claimed in claim 4 wherein the flat spring is aligned substantially vertically and the further flat spring is aligned substantially horizontally, extending from the flat spring in the same direction as the boom.
6. A seismometer as claimed in claim 4 comprising means for adjusting the position and/or alignment of the rigidly connected end of the further flat spring relative to the frame for setting-up the seismometer.
7. A seismometer as claimed in claim 4 wherein both the flat spring and the further flat spring are triangular and have their narrow ends pivoted to one another.
8. A seismometer as claimed in claim 4 comprising means for re-setting the rest position of the boom, said means comprising a weak spiral spring having its outer end connected to the pivoted junction of said flat spring and said further spring and its inner end connected to a reversibly rotatable shaft.

* * * * *

UNITED STATES PATENT AND TRADEMARK OFFICE
CERTIFICATE OF CORRECTION

PATENT NO. : 4,280,206
DATED : July 21, 1981
INVENTOR(S) : Cansun M. Guralp

It is certified that error appears in the above—identified patent and that said Letters Patent is hereby corrected as shown below:

Remove the passage running from column 4, line 43 to column 5, line 12 reading "(This stiffness is also... alone would provide." from its present position in the text, and re-insert it at column 6, line 17 immediately after "Nm/radian.", not starting a new paragraph therewith.

Signed and Sealed this

Twenty-fourth Day of November 1981

|SEAL|

Attest:

Attesting Officer

GERALD J. MOSSINGHOFF
Commissioner of Patents and Trademarks